United States Patent Office 3,745,146
Patented July 10, 1973

3,745,146
FIRE RETARDANT POLYMER COMPOSITION
Anderson O. Dotson, Jr., New Brunswick, Joseph Green, East Brunswick, and Lionel T. Wolford, Freehold, N.J., assignors to Cities Service Company, New York, N.Y.
No Drawing. Filed Oct. 29, 1971, Ser. No. 194,011
Int. Cl. C08f 45/58; C08g 51/58
U.S. Cl. 260—45.75 B          9 Claims

ABSTRACT OF THE DISCLOSURE

Normally flammable synthetic polymers are rendered flame retardant by incorporating therein a fire retarding agent having the structure of a brominated Diels-Alder adduct of maleic anhydride and a conjugated diene, such as butadiene.

BACKGROUND OF THE INVENTION

This invention relates to compositions of normally flammable organic materials and fire retarding agents. More specifically, it relates to flame retardant compositions of an organic material, such as a solid synthetic polymer, and a fire retarding agent having the structure of a brominated Diels-Alder adduct of maleic anhydride and a conjugated diene, such as a butadiene.

In recent years there has been a growing awareness of the need to render normally flammable organic materials less combustible. A particularly acute need has been recognized for means of preparing solid synthetic polymers which are fire retardant or flame resistant, particularly when such polymers are to be employed in building construction or wearing apparel or electrical installation. Prior art attempts to reduce the combustibility of such compositions by the incorporation of additives have succeeded in varying degrees in achieving an acceptable level of flame resistance; however, this has usually been accompanied by degradation of one or more of the desirable properties of the polymer. This is usually due to the high loading of additive that is required to achieve an adequate level of fire retardancy, but is often the result of such factors as the migratory properties or high volatility of the additive or the instability of the additive at conventional plastic molding temperatures. Typical prior art additives are described in U.S. Pats. 3,093,599 and 3,456,022.

The prior art recognizes two types of flame retardants: (1) additives that are blended physically and (2) monomers that are reactive and unite chemically with and become a portion of the polymer structure. The literature shows the use of halogenated difunctional organic acids or anhydrides as monomers in the preparation of polyester resins. There is no hint in the literature of the use of halogenated acids or anhydrides as physical additives to synthetic resins, such as polyolefins. Tables of Flame Retardant Compounds, such as found in "Modern Plastics Encyclopedia," Vol. 47, No. 10A, page 855 (McGraw-Hill, Inc., New York, N.Y.), list various additives and modifiers. Chlorendic anhydride, the Diels-Alder adduct of maleic anhydride and hexachlorocyclopentadiene, is shown as a reactive modifier for epoxies, polyesters and polyurethanes. These tables do not disclose use of this adduct, or similar compounds, as a physical additive.

SUMMARY OF THE INVENTION

It has now been discovered that compounds having the structure of a brominated Diels-Alder adduct of maleic anhydride and a substituted diene are effective fire retarding agents for normally flammable organic materials. These fire retarding agents, which are white solids, are effective in surprisingly low concentrations in organic polymer compositions. Especially surprising is the fact that these additives are compatible with polyolefin resins such as polypropylene and do not bloom to the surface.

Broadly, this invention is fire retardant compositions comprising a normally flammable organic material and a fire retarding agent having the structure of a brominated Diels-Alder adduct of maleic anhydride and a diene, and having the general formula:

$$\begin{array}{c} H \\ | \\ Z-C-C=O \\ \quad\quad\quad\searrow \\ \quad\quad\quad\quad O \\ \quad\quad\quad\nearrow \\ -C-C=O \\ | \\ H \end{array}$$

when Z is a divalent group having from 4 to about 16 carbon atoms and from 1 to 6 bromine atoms.

DESCRIPTION OF THE INVENTION

The aforementioned fire retarding agents, which are suitable for incorporation into compositions of this invention, can be prepared by a variety of procedures, such as those described in U.S. Pats. 2,550,744 and 2,576,080.

The formation of an adduct from a diene and a dienophile (Diels-Alder reaction) is well known. Maleic anhydride, which acts as a dienophile in the preparation of these brominated adducts, is a well known and commercially available chemical. Citraconic anhydride (methyl maleic anhydride) can also be used as a dienophile. The compounds which can be employed as the diene in preparing brominated Diels-Alder adduct contain from 4 to about 9 carbon atoms and have at least one conjugated double bond system, such as butadiene and furan. Dienes that can be used in forming Diels-Alder adducts of this invention are exemplified by:

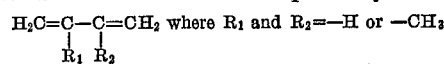

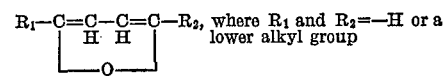

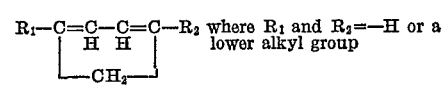

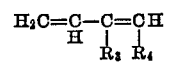

where

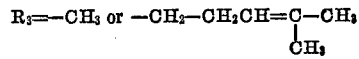

and

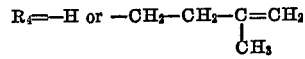

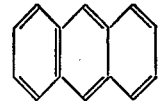

As used herein, the term "lower alkyl group" refers to alkyl groups having no more than 5 carbon atoms, exemplified by methyl, ethyl, propyl, etc. The dienes based on butadiene, cyclopentadiene and furan, the latter two compounds being bridged and having a methylene bridge and an oxygen bridge, respectively, connecting the terminal carbon atoms, represent a preferred group of such compounds.

As is illustrated in known procedures, Diels-Alder adducts formed from the above dienes and dienophiles can be brominated, thus forming the fire retarding agent of this invention.

The fire retarding agents described herein may be employed to reduce the flammability of any normally flammable natural or synthetic organic material, including cotton, wool, silk, paper, natural rubber, wood and paint, and are particularly effective in compositions of solid synthetic polymers. Illustrative of such polymers are the high molecular weight homopolymers and copolymers of unsaturated aliphatic and aromatic hydrocarbons, such as ethylene, propylene and styrene; acrylic polymers such as polyacrylonitrile and poly(methyl methacrylate); cellulose derivatives, such as cellulose acetate and methyl cellulose; furan resins; melamine resins; polyamide polymers, such as nylon-6 and nylon-66; vinyl resins, such as poly(vinyl acetate) and poly(vinyl chloride); rubbers or unsaturated elastomers, such as polyisoprene, polybutadiene, butadiene-acrylonitrile rubber, butadiene-styrene rubber, butyl rubber and neoprene rubber; acrylonitrile-butadiene-styrene (ABS) resins; and mixtures of such solid polymers. The fire retarding agents of this invention are used as physical additives in such normally organic material. Intimate mixing of the flammable organic material and a fire retardant agent can be accomplished by any suitable means; e.g., satisfactory results can be obtained with a solid polymer by employing an extruder, a 2-roll mill or a Banbury mixer. Optionally, one may also at this time incorporate in the resulting composition any desired fillers, pigments, plasticizers, anti-oxidants or other additives. It is often desirable to include one or more of the compounds of antimony, arsenic, phosphorus or bismuth, which are well known synergists for halogenated fire retardant compounds. Antimony trioxide is highly effective and commonly used for this purpose.

While any effective amount of the brominated adduct fire retarding agent can be employed to reduce flammability, it is generally desirable that this effective amount constitute from about 0.5 wt. percent to about 25 wt. percent, preferably from about 1 wt. percent to about 20 wt. percent, of the mixture of adduct and normally flammable organic material. It is seldom advantageous to employ larger quantities of adduct, except in the preparation of concentrates in which the adduct may constitute 50 wt. percent or more of the composition. When a metal compound synergist, such as antimony trioxide, also is incorporated in the composition, it is usually of maximum effectiveness when the adduct to synergist weight ratio varies from about 0.5:1 to about 5:1. The amount of the normally flammable organic material, exemplified by a solid synthetic polymer, in the flame retardant composition varies from about 98 wt. percent to about 50 wt. percent of the flame retardant composition. In order to protect the composition against thermal degradation during processing with the solid synthetic polymer, a stabilizer may be employed. Typical of such are organotin compounds, such as dibutyltin bis (isooctyl maleate), that can be used for this purpose. About 2 parts by weight, or less, of such a compound per 100 parts of flame retardant composition is usually satisfactory for effective thermal stabilization of said composition.

Because of the extraordinary fire retarding effectiveness of the brominated adducts of this invention, both alone and in conjunction with a synergist, they may be used in far lower concentrations than previously known fire retardant materials of equivalent stability. The fact that self-extinguishing properties can be attained at unexpectedly low loadings of such brominated adduct and synergist in solid polymers makes possible the preparation of flame retardant polymer compositions which largely retain the desirable physical characteristics of the pure polymer. It facilitates coloring of such compositions and also makes the preparation of concentrates practicable.

EXAMPLE I

In a flask fitted with a stirrer, a thermometer and a reflux condenser was placed 2.6 moles of maleic anhydride and 1 liter of ether. To the stirred mixture was added a solution of 2.6 moles of cyclopentadiene and 65 g. of heptane, in 50 ml. portions, at ambient temperature, over a 5 hour period. The adduct product precipitated during the 7 hour reaction period. The reaction mixture was then cooled to 10° C., filtered, and the precipitate obtained was dried. The precipitate, a white crystalline material, weighed 364 grams and had a melting point of 162–5° C.

In a flask equipped with a stirrer, reflux condenser, thermometer, and addition funnel, was placed a mixture of 328 g. (2.0 moles) of the maleic anhydride-cyclopentadiene adduct and 2 liters of chloroform. The mixture was stirred at ambient temperature, and 2 moles of bromine were added dropwise. During this addition, the temperature rose to 40° C., and this temperature was maintained by the addition rate of bromine. The addition period was 2 hours, followed by an additional hour of stirring, after which the reaction mixture was cooled to about 15° C. The crude reaction mixture was filtered, and the precipitate obtained was dried in a vacuum oven at ambient temperature, resulting in a product weighing 465 g. and having a melting point of 209–210° C. The product, a white crystalline material, contained 48.8% bromine (theory=49.3% bromine).

EXAMPLE II

In a flask fitted with a stirrer, a thermometer and a reflux condenser was placed 5 moles of maleic anhydride and 25.4 moles of furan. (Furan was also used as the solvent.) The reaction mixture was stirred at ambient temperature for 6 hours, during which time the reaction temperature increased from ambient to about 30° C. The adduct product precipitated during the reaction period. The reaction mixture was then cooled to 15° C., filtered, and the precipitate obtained was dried. The precipitate weighed 788 grams and had a melting point of 118° C.

In a flask equipped with a stirrer, reflux condenser, thermometer, and addition funnel, was placed a mixture of 498 g. (3.0 moles) of the maleic anhydride-furan adduct and 3.4 liters of chloroform. The mixture was stirred at ambient temperature, and 3.0 moles of bromine were added dropwise. During this addition, the temperature rose to 40° C., and this temperature was maintained by the addition rate of bromine. The addition period was 6 hours, after which the reaction mixture was cooled to about 15° C. The crude reaction mixture was filtered, and the precipitate obtained was dried in a vacuum oven at ambient temperature, resulting in a product weighing 715 g. and having a melting point of 157° C., with decomposition starting at 278° C., as measured by DTA.

EXAMPLE III

Using the procedure of Example I, 4,5-cyclohexene-1,2-dicarboxylic anhydride (from maleic anhydride and butadiene) was brominated, resulting in a solid product having a melting point of 200° C.

Using a similar procedure, the tetrabromomyrcene adduct of maleic anhydride was prepared. The brominated adduct formed an oil, probably dye to the mixture of stereoisomers.

The anthracene-maleic anhydride adduct was prepared by reacting the two ingredients in o-dichlorobenzene. The mixture was then cooled and filtered to obtain the adduct. The adduct was then dissolved in 65% oleum (concentrated sulfuric acid containing 65% added $SO_3$), and the solution was brominated in the typical manner, resulting in the hexabromoanthracene adduct of maleic anhydride. The melting point of this brominated adduct was 400° C.

EXAMPLE IV

The above brominated adducts, typical of the fire retarding agents that were prepared and tested, were mixed with various solid synthetic polymers and a synergist, and the resultant compositions were tested for flame retardancy. A typical procedure, using specific compounds, was:

The desired amount of impact polystyrene (containing about 10 wt. percent of a rubber such as polybutadiene) was weighed and charged to a Brabender at 356° F. The desired amount of antimony trioxide was then added, and mixing was continued until the materials were evenly dispersed. The desired amount of fire retarding agent was then added to the Brabender, and the resultant flame retardant composition was mixed from 5–10 minutes at 356° F. The well-mixed flame retardant composition was compression molded (at 300° F. and 40,000 p.s.i.g.) and cooled to room temperature. A ⅛″ x ¼″ x 5″ piece was cut from the molded piece, and the Oxygen Index was determined on this test piece, using ASTM–D2863 test procedure.

Various solid synthetic polymers were physically mixed with the fire retarding agents of this invention to form flame retardant compositions. The evaluation of these compositions is shown in Table I, below.

where $R_1$ and $R_2$ = —H or a lower alkyl group, (b) 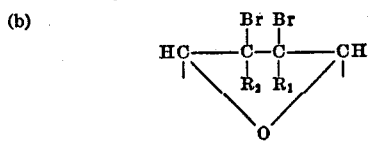

where $R_1$ and $R_2$ = —H or a lower alkyl group, (c) 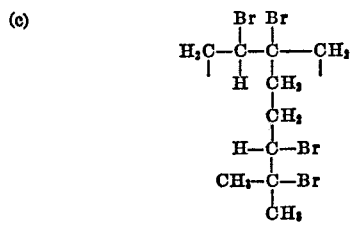

and (d) 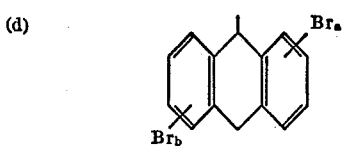

TABLE I.—EVALUATION OF VARIOUS BROMINATED ADDUCTS

| Run No. | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| Polypropylene (g.) | 100 | | | | 91.0 | 91.0 | 95.0 | | 83.1 | 78.7 | 91.8 | | | | | | | |
| Polyethylene (g.) | | 100 | | | | | | 91.0 | | | | | | | | | | |
| Impact polystyrene (g.) | | | 100 | | | | | | | | | 80.0 | 80.0 | | | | 80.0 | |
| ABS (g.) | | | | 100 | | | | | | | | | | 83.1 | 83.1 | 83.1 | | 83.0 |
| Sb₂O₃ (g.) | | | | | 2.9 | 2.9 | 1.6 | 3.0 | 4.0 | 7.0 | 2.6 | 5.0 | 5.0 | 3.9 | 3.9 | 3.9 | 5.0 | 4.0 |
| Dibromoadduct of maleic anhydride and cyclopentadiene (g.) | | | | | 6.1 | | | | | | | 15.0 | | 12.9 | | | | |
| Dibromoadduct of maleic anhydride and furan (g.) | | | | | | 6.1 | 3.3 | 6.0 | | | | | 15.0 | | 12.9 | | | |
| Dibromoadduct of maleic anhydride and butadiene (g.) | | | | | | | | | 12.9 | | | | | | | 12.9 | 15.0 | |
| Hexabromoadduct of maleic anhydride and anthracene (g.) | | | | | | | | | | 14.2 | | | | | | | | 12.9 |
| Tetrabromoadduct of maleic anhydride and myrcene (g.) | | | | | | | | | | | 5.8 | | | | | | | |
| Oxygen index | 17.8 | 17.8 | 18.6 | 19.0 | 27.0 | 27.1 | 26.0 | 26.6 | 24.1 | 23.0 | 23.0 | 21.9 | 24.4 | 25.5 | 25.8 | 24.1 | 22.3 | 30.6 |
| Bloom | | | | | None | None | None | | None | None | None | | | | | | | |

These experiments show that these brominated adduct fire retarding agents can act as physical additives in polymer compositions wherein the polymer does not react chemically with the additive.

The present invention has been described with reference to various embodiments. However, it will be appreciated by those skilled in the art that various changes and modifications can be made without departing from the scope of this invention.

We claim:

1. Composition comprising a normally flammable synthetic organic polymer and a fire retarding agent having the structure $$Z \begin{matrix} -\overset{H}{\underset{}{C}}-C=O \\ \phantom{-}\diagdown O \\ -\underset{H}{\overset{}{C}}-C=O \end{matrix}$$

wherein Z is a divalent, substituted organic group having from 4 to about 16 carbon atoms and from 1 to 6 bromine atoms and is selected from the group consisting of (a) 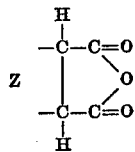

where the sum of $a+b=6$.

2. Composition of claim 1 wherein Z has the structure

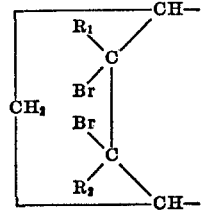

where $R_1$ and $R_2$ = hydrogen or a lower alkyl group.

3. Composition of claim 1 wherein Z has the structure

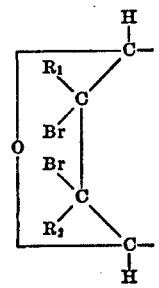

where $R_1$ and $R_2$ = hydrogen or a lower alkyl group.

4. Composition of claim 1 wherein Z has the structure

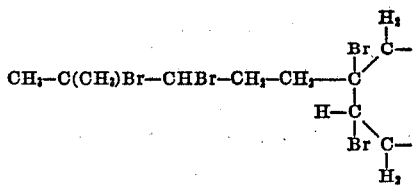

5. Composition of claim 1 wherein Z has the structure

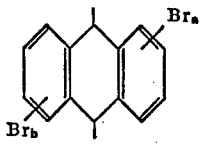

where the sum of $a+b=6$.

6. Composition of claim 1 wherein said normally flammable synthetic polymer is selected from the group consisting of polyethylene, polypropylene, polystyrene and acrylonitrile-butadiene-styrene.

7. Composition of claim 1 containing a synergist selected from compounds of antimony, arsenic, phosphorus and bismuth.

8. Composition of claim 7 wherein the synergist is antimony oxide.

9. The composition of claim 1 wherein $R_1$ and $R_2$ are hydrogen.

References Cited

UNITED STATES PATENTS

| | | | |
|---|---|---|---|
| 2,576,080 | 11/1951 | Tischler | 260—346.3 |
| 2,680,751 | 6/1954 | Prichard | 260—346.3 |
| 2,909,501 | 10/1959 | Robitschek et al. | 260—45.75 |
| 3,017,431 | 1/1962 | Schmerling | 260—346.3 |
| 3,216,960 | 11/1965 | Monroe | 260—45.75 |
| 3,346,597 | 10/1967 | Acetis | 260—45.8 |
| 3,403,118 | 9/1968 | Listner | 260—45.7 |
| 3,418,267 | 12/1968 | Busse | 260—45.75 |

OTHER REFERENCES

Chemical Abstracts, vol. 64, abstracts 4955d through 4957a (1966).

MAURICE J. WELSH, Primary Examiner

V. P. HOKE, Assistant Examiner

U.S. Cl. X.R.

260—2.5 AJ, 2.5 FP, 45.8 A, 880